United States Patent
Croak et al.

(10) Patent No.: US 8,538,005 B2
(45) Date of Patent: *Sep. 17, 2013

(54) METHOD AND APPARATUS FOR PROVIDING USER ACCESS VIA MULTIPLE PARTNER CARRIERS FOR INTERNATIONAL CALLS

(75) Inventors: Marian Croak, Fair Haven, NJ (US); Hossein Eslambolchi, Los Altos Hills, CA (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 153 days.

This patent is subject to a terminal disclaimer.

(21) Appl. No.: 12/794,471

(22) Filed: Jun. 4, 2010

(65) Prior Publication Data

US 2010/0246572 A1 Sep. 30, 2010

Related U.S. Application Data

(63) Continuation of application No. 11/240,895, filed on Sep. 30, 2005, now Pat. No. 7,734,024.

(51) Int. Cl.
*H04M 7/00* (2006.01)

(52) U.S. Cl.
USPC ............................. 379/221.02; 379/115.03

(58) Field of Classification Search
USPC ............. 379/221.02, 221.01, 220.01, 221.14, 379/114.01, 114.02, 114.03, 114.06, 115.01, 379/115.02, 115.03; 370/352
See application file for complete search history.

(56) References Cited

U.S. PATENT DOCUMENTS

| | | | |
|---|---|---|---|
| 4,751,728 A * | 6/1988 | Treat | 379/114.01 |
| 5,359,649 A | 10/1994 | Rosu et al. | |
| 5,550,903 A * | 8/1996 | Chang | 379/112.06 |
| 5,764,741 A * | 6/1998 | Barak | 379/114.02 |
| 5,793,854 A * | 8/1998 | Kashepava | 379/130 |
| 5,799,071 A * | 8/1998 | Azar et al. | 379/114.02 |
| 5,878,122 A * | 3/1999 | White et al. | 379/115.01 |
| 6,021,191 A * | 2/2000 | Ash et al. | 379/221.05 |
| 6,084,953 A * | 7/2000 | Bardenheuer et al. | 379/114.01 |
| 6,169,791 B1 * | 1/2001 | Pokress | 379/114.02 |
| 6,188,683 B1 * | 2/2001 | Lang et al. | 370/352 |
| 6,205,211 B1 * | 3/2001 | Thomas et al. | 379/114.06 |
| 6,226,365 B1 * | 5/2001 | Mashinsky | 379/114.02 |
| 6,310,873 B1 * | 10/2001 | Rainis et al. | 370/356 |
| 6,473,499 B1 * | 10/2002 | Ng et al. | 379/121.02 |
| 6,532,366 B1 * | 3/2003 | Chung et al. | 455/445 |
| 6,542,588 B1 * | 4/2003 | Mashinsky | 379/114.02 |
| 6,748,064 B2 * | 6/2004 | Zbib | 379/114.02 |
| 6,791,970 B1 * | 9/2004 | Ng et al. | 370/352 |
| 6,853,621 B1 * | 2/2005 | Spear et al. | 370/238 |
| 6,885,997 B1 * | 4/2005 | Roberts | 705/26.64 |
| 7,734,024 B1 | 6/2010 | Croak et al. | |
| 7,801,783 B2 * | 9/2010 | Kende et al. | 705/35 |
| 8,005,726 B1 * | 8/2011 | Bao | 705/27.1 |
| 2002/0044635 A1 * | 4/2002 | Klug | 379/114.02 |
| 2002/0101974 A1 * | 8/2002 | Zbib | 379/221.02 |
| 2002/0120540 A1 * | 8/2002 | Kende et al. | 705/35 |

(Continued)

*Primary Examiner* — Olisa Anwah

(57) ABSTRACT

A method and apparatus for providing subscribers of a VoIP service provider to take advantage of wholesale arrangements made by the VoIP service provider with one or more international partner carrier network providers to one or more international countries are disclosed. Specifically, the present method enables a VoIP service provider to display a web page to their subscribers, for each destination country, with one or more international partner network providers and their corresponding calling rates and/or call completion success rates to each particular destination country.

20 Claims, 5 Drawing Sheets

(56) References Cited

U.S. PATENT DOCUMENTS

| | | | |
|---|---|---|---|
| 2003/0014271 A1* | 1/2003 | Hwang | 705/1 |
| 2005/0286490 A1* | 12/2005 | Tsai et al. | 370/352 |
| 2006/0077943 A1* | 4/2006 | Liu et al. | 370/338 |
| 2006/0079238 A1 | 4/2006 | Liu et al. | |
| 2007/0003035 A1* | 1/2007 | Zhu et al. | 379/114.02 |

* cited by examiner

METHOD AND APPARATUS FOR PROVIDING USER ACCESS VIA MULTIPLE PARTNER CARRIERS FOR INTERNATIONAL CALLS

This application is a continuation of U.S. patent application Ser. No. 11/240,895, filed Sep. 30, 2005 now U.S. Pat. No. 7,734,024, which is currently allowed and is incorporated herein by reference in its entirety.

The present invention relates generally to communication networks and, more particularly, to a method and apparatus for providing user access via multiple partner carriers for international calls in communication networks, e.g., packet networks such as Voice over Internet Protocol (VoIP) networks.

BACKGROUND OF THE INVENTION

VoIP service providers of domestic and international services often provide least cost access arrangements with multiple international partner carriers. For example, a VoIP service provider may have two or three arrangements with partner carrier network providers in another country, say country A, who compete with each other in terms of termination rates and/or quality of service targets. Since these different international partner carrier network providers offer different calling rates and quality of service targets, a subscriber of the VoIP service provider should be able to choose from and place international calls through these different international partner carriers via the VoIP network.

Therefore, a need exists for a method and apparatus for providing user access via multiple partner carriers for international calls in a packet network, e.g., a VoIP network.

SUMMARY OF THE INVENTION

In one embodiment, the present invention enables subscribers of a packet network service provider, e.g., a VoIP service provider to take advantage of wholesale arrangements made by the VoIP service provider with one or more international partner carrier network providers to one or more international countries. Specifically, the present invention enables a VoIP service provider to display a web page to their subscribers, for each destination country, with one or more international partner network providers and their corresponding calling rates and/or call completion success rates to each particular destination country. These corresponding calling rates and/or call completion rates are updated dynamically on customer facing web pages to reflect the most current information. End users or subscribers of the VoIP service provider are then allowed to choose from these international partner carrier network providers based on available calling rates and call completion success rates to place calls to their intended destination countries. Subscribers can select the preferred carrier through which to place international calls by calling a specified access number on a call by call basis. Subscribers can also place international calls using a hot link, e.g., a hypertext link or hyperlink, on the dynamically updated customer facing web pages to their intended called parties.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
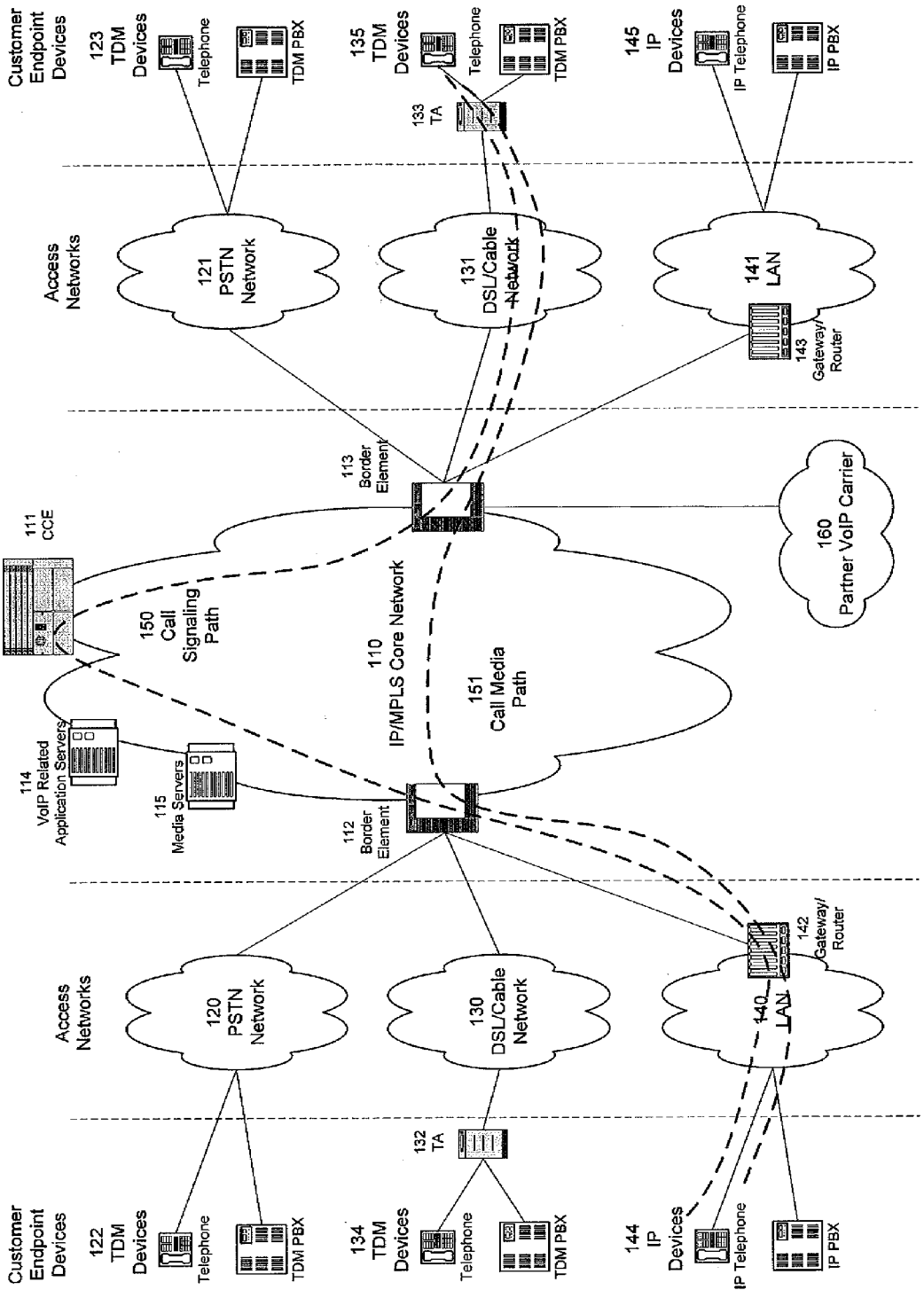
FIG. 1 illustrates an exemplary Voice over Internet Protocol (VoIP) network related to the present invention.

To better understand the present invention, FIG. 1 illustrates an example network, e.g., a packet network such as a VoIP network related to the present invention. Exemplary packet networks include internet protocol (IP) networks, asynchronous transfer mode (ATM) networks, frame-relay networks, and the like. An IP network is broadly defined as a network that uses Internet Protocol to exchange data packets. Thus, a VoIP network or a SoIP (Service over Internet Protocol) network is considered an IP network.

In one embodiment, the VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. The present invention is described below in the context of an illustrative VoIP network. Thus, the present invention should not be interpreted to be limited by this particular illustrative architecture.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or IP PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such the Border Element (BE) 112 and 113, the Call Control Element (CCE) 111, VoIP related Application Servers (AS) 114, and Media Server (MS) 115. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller or a softswitch and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related Application Servers (AS) in order to complete a call that require certain service specific features, e.g. translation of an E.164 voice network address into an IP address.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related application server 114 to obtain the information to complete this call. In one embodiment, the Application Server (AS) functions as a SIP back-to-back user agent. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP 200 OK response message if SIP is used, is sent in the reverse direction back to the CCE 111. After the CCE 111 receives the call acknowledgement message, it will then send a call acknowledgement signaling message, such as a SIP 200 OK response message if SIP is used, toward the calling party. In addition, the CCE 111 also provides the necessary information of the call to both BE 112 and BE 113 so that the call data exchange can proceed directly between BE 112 and BE 113. The call signaling path 150 and the call media path 151 are illustratively shown in FIG. 1. Note that the call signaling path and the call media path are different because once a call has been setup up between two endpoints, the CCE 111 does not need to be in the data path for actual direct data exchange.

Media Servers (MS) 115 are special servers that typically handle and terminate media streams, and to provide services such as announcements, teleconference bridges, transcoding, and Interactive Voice Response (IVR) messages for VoIP service applications.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

Packet network service providers, e.g., VoIP service providers of domestic and international services often provide least cost access arrangements with multiple international partner carriers. For example, a VoIP service provider may have two or three arrangements with partner carrier network providers in another country, say country A, who compete with each other in terms of termination rates and/or quality of service targets. Since these different international partner carrier network providers offer different calling rates and/or quality of service targets, a subscriber of the VoIP service provider should be able to choose from and place international calls through these different international partner carriers via the VoIP network.

To address this need, the present invention enables subscribers of a packet network service provider, e.g., a VoIP service provider to take advantage of wholesale arrangements made by the VoIP service provider with one or more international partner carrier network providers to one or more international countries. Specifically, the present invention enables a VoIP service provider to display a web page to their subscribers, for each destination country, with one or more international partner network providers and their corresponding calling rates and/or call completion success rates to each particular destination country. These corresponding calling rates and call completion rates are updated dynamically on customer facing web pages to reflect the most current information.

End users or subscribers of the VoIP service provider are then allowed to choose from these international partner carrier network providers based on available calling rates and call completion success rates to place calls to their intended destination countries. Subscribers can select the preferred carrier through which to place international calls by calling a specified access number on a call by call basis. Subscribers can also place international calls using a hot link, e.g., a hypertext link or hyperlink, on the dynamically updated customer facing web pages to their intended called parties. The call completion rate is defined to be the number of call setup attempts that are successfully completed divided by the number of call setup attempts. A hot link, a hypertext link, or a hyperlink is an element on a web page which can be clicked on to jump to another web page in the Internet.

Figure 2:
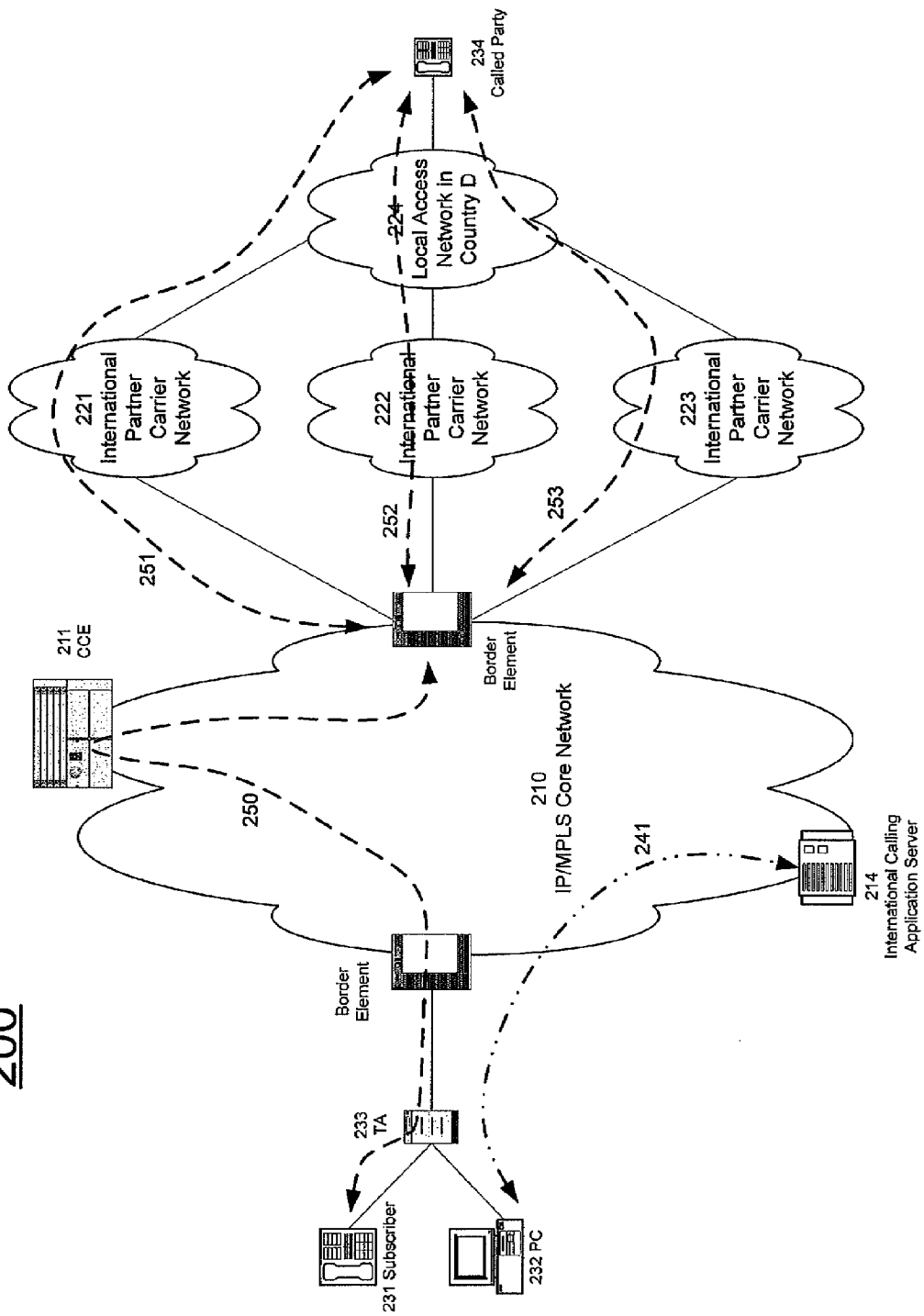
FIG. 2 illustrates an example of enabling user access via multiple partner carriers for international calls in a VoIP network of the present invention.

FIG. 2 illustrates an exemplary communication architecture 200 for enabling user access via multiple partner carriers for international calls in a packet network, e.g., a VoIP network of the present invention. In FIG. 2, subscriber 231 is a subscriber of VoIP services, both domestic and international services, of network 210. Subscriber 231 uses personal computer (PC) 232 to access international calling application server 214, using data flow 241 via the internet, to view web pages that provide the latest calling rates and/or call completion rates of available international partner carriers that serve the destination country to which an international call is to be placed. Subscriber 231 finds out that there are three international partner carriers that serve the destination country, D, which can reach called party 234. After viewing the information on the web page(s), subscriber 231 can place a call to called party 234 via three different carriers, international partner carrier 221, international partner carrier 222, and international partner carrier 223. If international partner carrier 221 is chosen, then subscriber can use a predefined access number to place the call using international partner carrier 221 via signaling flow 250. Upon receiving the call setup message originated by subscriber 231, CCE 211 finds out the access number of international partner carrier 221 is used; therefore, CCE 211 sends the call setup message using signaling flow 251 to reach called party 234 via international partner carrier 221 and local access network 224 in country D.

If international partner carrier 222 is chosen, then subscriber can use a predefined access number to place the call using international partner carrier 222 via signaling flow 250. Upon receiving the call setup message originated by subscriber 231, CCE 211 finds out the access number of international partner carrier 222 is used; therefore, CCE 211 sends the call setup message using signaling flow 252 to reach called party 234 via international partner carrier 222 and local access network 224 in country D.

If international partner carrier 223 is chosen, then subscriber can use a predefined access number to place the call using international partner carrier 223 via signaling flow 250. Upon receiving the call setup message originated by subscriber 231, CCE 211 finds out the access number of international partner carrier 223 is used; therefore, CCE 211 sends the call setup message using signaling flow 253 to reach called party 234 via international partner carrier 223 and local access network 224 in country D.

Note that subscriber 231 can place a call by dialing from a telephone handset or using PC 232 by clicking a hot link on the web page being viewed to access a particular international partner carrier. Both approaches are supported by the present invention.

Figure 3:
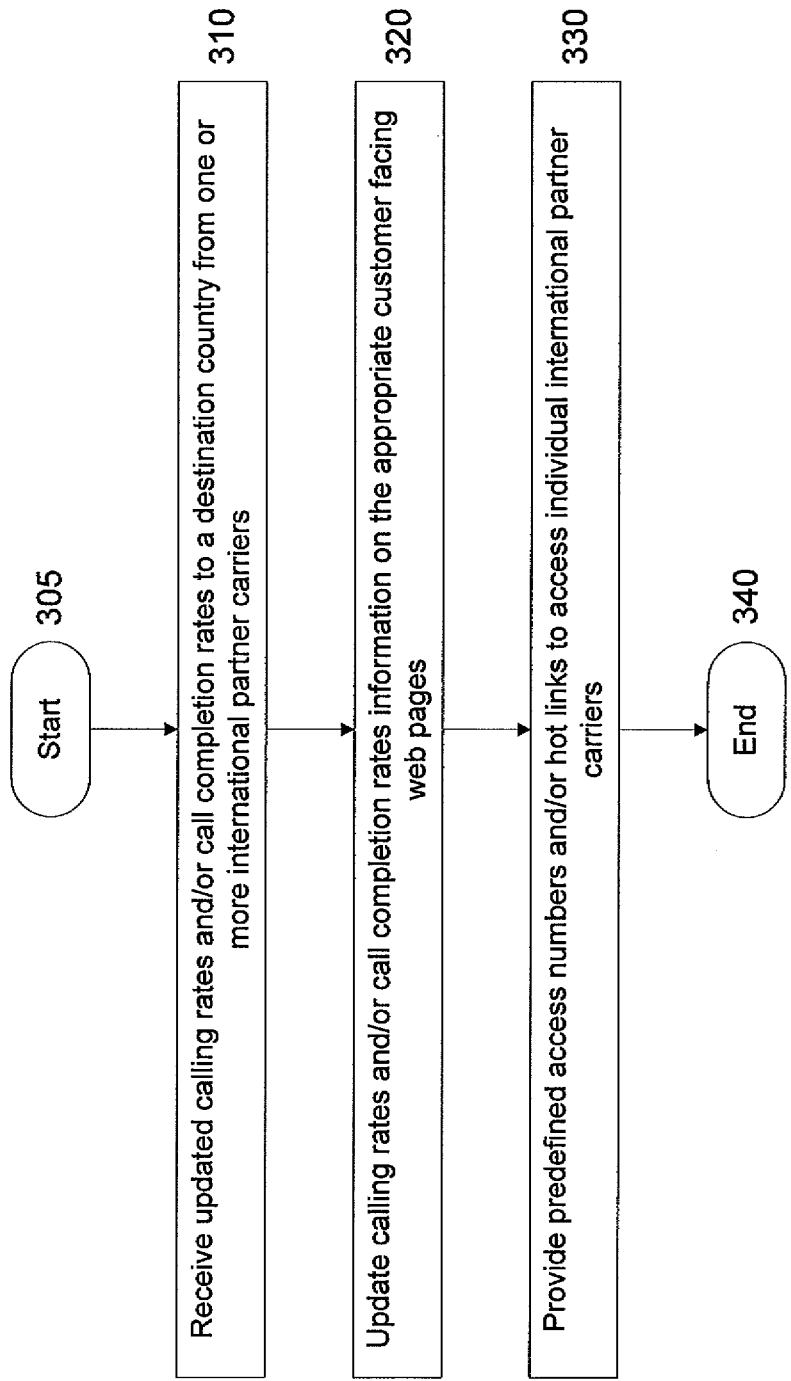
FIG. 3 illustrates a flowchart of a method for updating user access via multiple partner carriers for international calls in a VoIP network of the present invention.

FIG. 3 illustrates a flowchart of a method 30 for updating user access via multiple partner carriers for international calls in a packet network, e.g., a VoIP network of the present invention. Method 300 starts in step 305 and proceeds to step 310.

In step 310, the method receives updated calling rates and/or call completion rates to a destination international country from one or more international partner carriers.

In step 320, the method immediately updates the call rate and/or call completion rate information on the appropriate customer facing web pages.

In step 330, the method provides a set of predefined access numbers and/or hot links for all partner carriers on the customer facing web pages through which calls to the destination international country can be made. The method ends in step 340.

Figure 4:
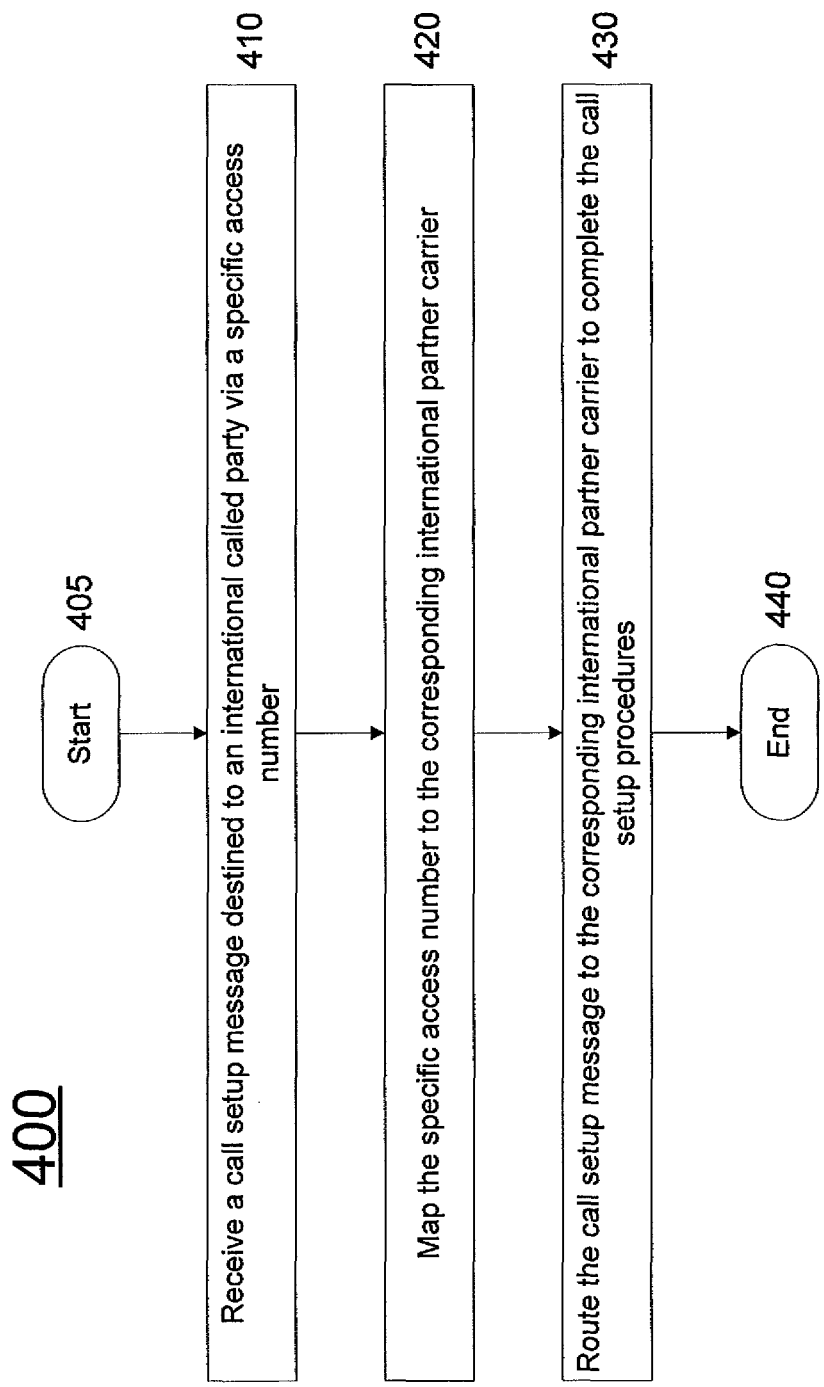
FIG. 4 illustrates a flowchart of a method for enabling user access via multiple partner carriers for international calls in a VoIP network of the present invention.

FIG. 4 illustrates a flowchart of a method 400 for enabling user access via multiple partner carriers for international calls in a VoIP network of the present invention. Method 400 starts in step 405 and proceeds to step 410.

In step 410, the method receives a call setup message destined to an international destination country called party via a specific access number.

In step 420, the method maps the specific access number into the corresponding international partner carrier.

In step 430, the method routes the call setup message to the specific international partner carrier to complete the call setup procedures. The method ends in step 440.

Figure 5:
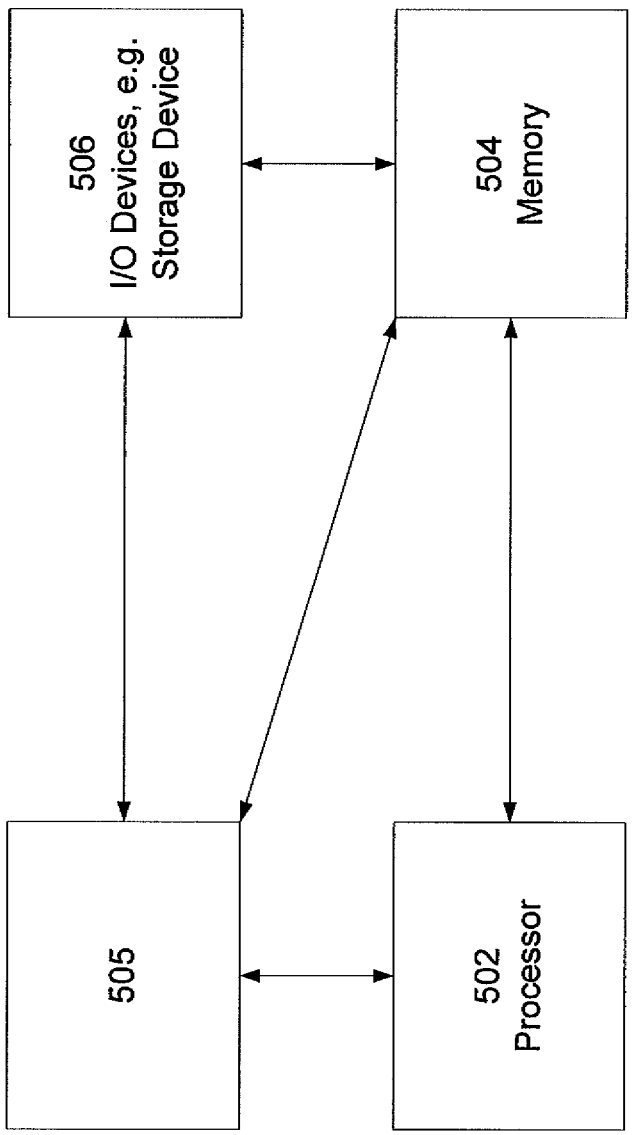
FIG. 5 illustrates a high level block diagram of a general purpose computer suitable for use in performing the functions described herein.

FIG. 5 depicts a high level block diagram of a general purpose computer suitable for use in performing the functions described herein. As depicted in FIG. 5, the system 500 comprises a processor element 502 (e.g., a CPU), a memory 504, e.g., random access memory (RAM) and/or read only memory (ROM), a module 505 for providing user access via multiple partner carriers for international calls, and various input/output devices 506 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 505 for providing user access via multiple partner carriers for international calls can be loaded into memory 504 and executed by processor 502 to implement the functions as discussed above. As such, the present process 505 for providing user access via multiple partner carriers for international calls (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for providing a plurality of international partner carriers for international calls in a communication network, comprising:

receiving, by a processor of a communication network service provider, a calling rate and a call completion rate to an international country from the plurality of international partner carriers;

publishing, by the processor, the calling rate and the call completion rate for review by a plurality of subscribers, wherein the calling rate of one of the plurality of international partner carriers is selected by a subscriber of the plurality of subscribers after review of the calling rate and the call completion rate; and processing, by the processor, an international call through the one of the plurality of international partner carriers selected by the subscriber of the plurality of subscribers.

2. The method of claim 1, wherein the communication network is an internet protocol network.

3. The method of claim 1, wherein the calling rate and the call completion rate are received by an international calling application server of the communication network.

4. The method of claim 1, wherein the publishing comprises:

updating a website with the calling rate and the call completion rate to the international country; and providing an access number for the plurality of international partner carriers on the website.

5. The method of claim 1, wherein the processing comprises:

receiving a call setup message with an access number entered by the subscriber, where the access number is associated with one of the plurality of international partner carriers; and routing the call setup message to one of the plurality of international partner carriers that corresponds to the access number to complete the international call.

6. The method of claim 5, wherein the call setup message is received by a call control element.

7. The method of claim 5, wherein a mapping of the access number to one of the plurality of international partner carriers is retrieved from an application server.

8. A tangible computer-readable medium storing a plurality of instructions which, when executed by a processor, cause the processor to perform operations for providing a plurality of international partner carriers for international calls in a communication network, the operations comprising:
   receiving a calling rate and a call completion rate to an international country from the plurality of international partner carriers;
   publishing the calling rate and the call completion rate for review by a plurality of subscribers, wherein the calling rate of one of the plurality of international partner carriers is selected by a subscriber of the plurality of subscribers after review of the calling rate and the call completion rate; and
   processing an international call through the one of the plurality of international partner carriers selected by the subscriber of the plurality of subscribers.

9. The tangible computer-readable medium of claim 8, wherein the communication network is an internet protocol network.

10. The tangible computer-readable medium of claim 8, wherein the calling rate and the call completion rate are received by an international calling application server of the communication network.

11. The tangible computer-readable medium of claim 8, wherein the publishing comprises:
   updating a website with the calling rate and the call completion rate to the international country; and
   providing an access number for the plurality of international partner carriers on the website.

12. The tangible computer-readable medium of claim 8, wherein the processing comprises:
   receiving a call setup message with an access number entered by the subscriber, where the access number is associated with one of the plurality of international partner carriers; and
   routing the call setup message to one of the plurality of international partner carriers that corresponds to the access number to complete the international call.

13. The tangible computer-readable medium of claim 12, wherein the call setup message is received by a call control element.

14. The tangible computer-readable medium of claim 12, wherein a mapping of the access number to one of the plurality of international partner carriers is retrieved from an application server.

15. An apparatus for providing a plurality of international partner carriers for international calls in a communication network, comprising:
   a processor of a communication network service provider; and
   a computer-readable medium storing a plurality of instructions which, when executed by the processor, cause the processor to perform operations, the operations comprising:
      receiving a calling rate and a call completion rate to an international country from the plurality of international partner carriers;
      publishing the calling rate and the call completion rate for review by a plurality of subscribers, wherein the calling rate of one of the plurality of international partner carriers is selected by a subscriber of the plurality of subscribers after review of the calling rate and the call completion rate; and
      processing an international call through the one of the plurality of international partner carriers selected by the subscriber of the plurality of subscribers.

16. The apparatus of claim 15, wherein the communication network is an internet protocol network.

17. The apparatus of claim 15, wherein the publishing comprises:
   updating a website with the calling rate and the call completion rate to the international country; and
   providing an access number for the plurality of international partner carriers on the website.

18. The apparatus of claim 15, wherein the processing comprises:
   receiving a call setup message with an access number entered by the subscriber, where the access number is associated with one of the plurality of international partner carriers; and
   routing the call setup message to one of the plurality of international partner carriers that corresponds to the access number to complete the international call.

19. The apparatus of claim 18, wherein the apparatus comprises a call control element.

20. The apparatus of claim 18, wherein a mapping of the access number to one of the plurality of international partner carriers is retrieved from an application server.

* * * * *